(12) United States Patent
Sornborger et al.

(10) Patent No.: US 9,916,530 B2
(45) Date of Patent: Mar. 13, 2018

(54) NEUROMORPHIC CIRCUIT MODEL SIMULATION THAT FACILITATES INFORMATION ROUTING AND PROCESSING

(71) Applicant: The Regents of the University of California, Oakland, CA (US)

(72) Inventors: Andrew T. Sornborger, Davis, CA (US); Louis Tao, Beijing (CN)

(73) Assignee: The Regents of the University of California, Oakland, CA (US)

( * ) Notice: Subject to any disclaimer, the term of this patent is extended or adjusted under 35 U.S.C. 154(b) by 349 days.

(21) Appl. No.: 14/874,267

(22) Filed: Oct. 2, 2015

(65) Prior Publication Data

US 2016/0098630 A1 Apr. 7, 2016

Related U.S. Application Data

(60) Provisional application No. 62/059,708, filed on Oct. 3, 2014, provisional application No. 62/236,539, filed on Oct. 2, 2015.

(51) Int. Cl.
*G06N 3/08* (2006.01)
*G06N 3/063* (2006.01)
*G06N 3/04* (2006.01)

(52) U.S. Cl.
CPC .............. *G06N 3/08* (2013.01); *G06N 3/049* (2013.01); *G06N 3/063* (2013.01)

(58) Field of Classification Search
CPC .................. G06N 3/063; G06N 3/049
See application file for complete search history.

(56) References Cited

U.S. PATENT DOCUMENTS

2007/0011118 A1* 1/2007 Snook ................. G06F 15/7867
706/16
2009/0043722 A1* 2/2009 Nugent ................. G06N 3/063
706/25

(Continued)

OTHER PUBLICATIONS

J. M. Kinser and T. Lindblad, "Implementation of pulse-coupled neural networks in a CNAPS environment," IEEE Trans. Neural Networks, vol. 10, (3), pp. 584-590, 1999.*

*Primary Examiner* — Ajay Ojha
(74) *Attorney, Agent, or Firm* — Park, Vaughan, Fleming & Dowler LLP

(57) ABSTRACT

The disclosed embodiments relate to a system that selectively propagates information through a neuromorphic circuit comprising a set of interconnected neurons. During operation, a neuron in the set of neurons receives information-carrying current pulses from one or more upstream information-carrying neurons, wherein the information-carrying current pulses are insufficient to cause the neuron to generate output current pulses. The neuron also receives selectively generated gating current pulses from one or more gating neurons, wherein the gating current pulses cause a neural voltage of the neuron to approach a firing threshold. In this way, concurrently received information-carrying current pulses combine with the gating current pulses to cause the neural voltage to exceed the firing threshold, which causes the neuron to generate output current pulses that propagate to downstream neurons.

18 Claims, 6 Drawing Sheets
(1 of 6 Drawing Sheet(s) Filed in Color)

(56) References Cited

U.S. PATENT DOCUMENTS

2009/0313195 A1\* 12/2009 McDaid ................ G06N 3/049 706/26
2016/0034812 A1\* 2/2016 Gibson ................... G06N 3/08 706/25

\* cited by examiner

NEUROMORPHIC CIRCUIT MODEL SIMULATION THAT FACILITATES INFORMATION ROUTING AND PROCESSING

CROSS-REFERENCE TO RELATED APPLICATION

This application claims priority under 35 U.S.C. § 119(e) to U.S. Provisional Application Ser. No. 62/059,708, entitled "Method for Exactly Transferring Information in a Neuromorphic Circuit," by inventors Andrew T. Sornborger and Louis Tao, filed on 3 Oct. 2014, the contents of which are herein incorporated by reference. This application also claims priority under 35 U.S.C. § 119(e) to U.S. Provisional Application Ser. No. 62/236,539, entitled "Graded, Dynamically Routable Information Processing with Synfire-Gated Synfire Chains," by inventors Andrew T. Sornborger and Louis Tao, filed on 2 Oct. 2015, the contents of which are herein incorporated by reference.

BACKGROUND

Field

The disclosed embodiments generally relate to circuits that facilitate information-processing. More specifically, the disclosed embodiments relate to a neuromorphic circuit that facilitates routing and processing information contained in current pulses transferred between neural circuit elements.

Related Art

In recent years, a significant amount of research has been directed toward "neuromorphic circuits" that attempt to mimic the behavior of neurons in the human brain. Neuromorphic circuits typically comprise a collection of circuit elements that model individual neurons, wherein each circuit element receives input current pulses from upstream neurons and generates output current pulses that are directed to downstream neurons. (We refer to these circuit elements as "neural circuit elements" or "neurons.") Researchers have attempted to vary the functional characteristics of such neurons, and the interconnections between them, in an effort to reproduce the information-processing mechanisms within the human brain.

Some of this research has uncovered interesting collective behavior of such neurons. However, techniques for performing basic information-processing operations using collections of such neurons still need to be developed. For example, these basic information-processing operations include: (1) routing operations for routing information between neurons; (2) storage operations for storing information in collections of neurons; and (3) computational operations for performing computations on information contained in collections of neurons.

Hence, what is needed are techniques for efficiently and effectively performing these basic information-processing operations in collections of neurons.

SUMMARY

The disclosed embodiments provide a system wherein information coded in the mean current amplitude of a population of neurons may be transferred to a second population of neurons. The technique operates by applying appropriately timed pulses to neuronal populations. An innovative feature of this technique is that the transfer is exact in the large-neuron limit, and works well even for populations of 100 or so neurons. Additionally, since it is pulse-based, transfer is dynamically routable. Thus, within a neural circuit with fixed connectivity, information may, nonetheless, be sent to specifically targeted populations of neurons or simulated neurons.

The technique operates in a system that comprises a set of one or more populations of neurons or simulated neurons with sparse feed-forward connectivity. Information transfer is effected by a gating pulse which excites an upstream simulated neuronal population into the firing regime, thereby generating a synaptic current in the downstream simulated neuronal population. While the upstream simulated neuronal population experiences an excitatory pulse, the downstream neuronal or simulated neuronal population is inhibited by either an inhibitory pulse or an ongoing inhibition until the feed-forward synaptic current is integrated. Subsequent transfers may be effected in the same way.

To our knowledge, this technique is the first to be able to exactly transfer graded information in the form of a current amplitude between neuronal or simulated neuronal populations in a neural circuit. Moreover, transfer may be effected over a range of pulse times and for neurons with arbitrary time constants. For very short time constants, rapid exact transfers are possible (on the synaptic timescale). An important novel feature is that information content and control are performed by separate neuronal populations. Thus, for example, one upstream neuronal population may be synaptically connected to two or more downstream populations and information may be selectively transferred downstream depending on which downstream populations are pulsed. Transfer for a given synaptic connectivity may be effected on two timescales. Thus, an amplitude transferred via a short pulse may subsequently be transferred by a long pulse and vice versa.

This technique effects exact and dynamically routable information transfer between populations of neurons such as those now becoming available on neuromorphic computers. It enables the implementation on a neuromorphic computer of a large-scale, parallel information processing framework where a set of linear maps is actively controlled by a pulse-generator. Thus, parallel algorithms may be mapped directly to a network of spiking neurons.

More specifically, the disclosed embodiments provide a system that selectively propagates information through a neuromorphic circuit comprising a set of interconnected neurons. During operation, a neuron within the set of neurons receives information-carrying current pulses from one or more upstream information-carrying neurons, wherein the information-carrying current pulses are insufficient to cause the neuron to generate output current pulses. The neuron also receives selectively generated gating current pulses from one or more gating neurons, wherein the gating current pulses cause a neural voltage of the neuron to approach a firing threshold. In this way, concurrently received information-carrying current pulses combine with the gating current pulses to cause the neural voltage to exceed the firing threshold, which causes the neuron to generate output current pulses that propagate to downstream neurons.

In some embodiments, the system selectively generates the gating current pulses that feed into the neuron to cause the neuron to selectively propagate the information-carrying current pulses to the downstream neurons.

In some embodiments, the information-carrying current pulses and the gating current pulses are combined in a capacitive element within the neuron to produce the neural voltage.

In some embodiments, the system directs gating current pulses to two of the downstream neurons to cause the information-carrying current pulses to be copied to the two downstream neurons.

In some embodiments, the system directs gating current pulses to a first neuron and not to a second neuron in the downstream neurons to cause the information-carrying current pulses to be selectively propagated to the first neuron and not to the second neuron. In this embodiment, the system can alternatively direct gating current pulses to the second neuron and not to the first neuron to cause the information-carrying current pulses to be selectively propagated to the second neuron and not to the first neuron.

In some embodiments, the downstream neurons include a circular chain of neurons, and the system directs gating current pulses to neurons in the circular chain of neurons in sequential order to cause the information-carrying current pulses to continually propagate around the circular chain of neurons, whereby the circular chain of neurons functions as a memory for the information-carrying current pulses.

In some embodiments, the set of neurons includes an upstream population of neurons and a downstream population of neurons, wherein the neurons in the upstream population are connected to neurons in the downstream population through weighted links, wherein a firing rate of a given neuron in the downstream population is a weighted sum of inputs to the given neuron from the upstream population of neurons. In these embodiments, a vector encoded in information-carrying pulses from the upstream population of neurons is transformed through a matrix operation defined by the weighted links to produce a transformed vector of information-carrying pulses that is propagated through the downstream population of neurons by applying gating current pulses to the downstream population of neurons.

In some embodiments, the neuromorphic circuit is implemented as: a digital electrical circuit; an analog electrical circuit; or an electrochemical circuit that transmits information through electrochemical signaling.

In some embodiments, the set of neurons includes information-carrying neurons and gating neurons, wherein the gating neurons are connected into a gating chain, wherein gating current pulses propagate sequentially through the gating neurons in the gating chain. Moreover, the information-carrying neurons are organized into an information-carrying chain, wherein information-carrying current pulses propagate through information-carrying neurons in the information-carrying chain under control of gating current pulses received from corresponding gating neurons in the gating chain.

In some embodiments, the information-carrying neurons in the information-carrying chain are organized into layers, wherein each layer contains two or more information-carrying neurons, and wherein the layers are sequentially connected to form the information-carrying chain.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Selective Propagation of Information Through a Neuron

Figure 1:
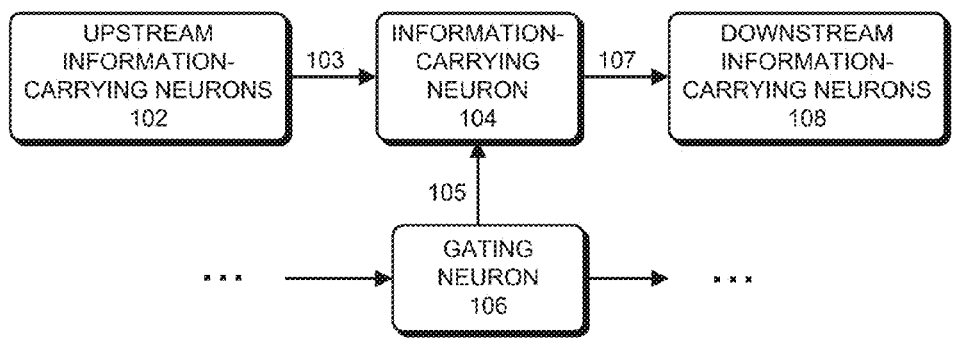
FIG. 1 illustrates connections to an information-carrying neuron in accordance with disclosed embodiments.

FIG. 1 illustrates connections to an exemplary information-carrying neuron 104 in accordance with disclosed embodiments. As illustrated in FIG. 1, neuron 104 receives one or more information-carrying inputs 103 from one or more upstream information-carrying neurons 102, and also receives one or more gating inputs 105 from one or more gating neurons 106. In response to inputs 103 and 105, neuron 104 generates one or more information-carrying outputs 107 that feed into inputs of one or more downstream information-carrying neurons 108 (and possibly into downstream gating neurons). During operation, neuron 104 receives input current pulses from inputs 103 and 105 at specific firing rates and, if conditions are right, generates output current pulses at a specific firing rate on outputs 107.

Note that neuron 104 can be implemented using a number of different types of circuits. For example, neuron 104 can be implemented using an analog electronic circuit, which sums input current pulses on an internal capacitor. When a voltage on this internal capacitor exceeds a threshold, the internal capacitor discharges to generate an output current pulse. This process is repeated to generate a sequence of output current pulses at a specific firing rate.

In another example, neuron 104 can be implemented as a digital electronic circuit. In this implementation, neuron 104 can comprise a sequential circuit, such as a micro-processor or other finite state machine, which reads digital input current pulses and generates digital output current pulses. In this example, neuron 104 can keep track of its internal neural voltage using a variable, which increases as input current pulses are received, and which falls to zero when an output current pulse is generated.

In yet another example, neuron 104 can be implemented using an electrochemical circuit that operates like a neuron in a human brain and transmits information through electrochemical signaling.

Figure 2:
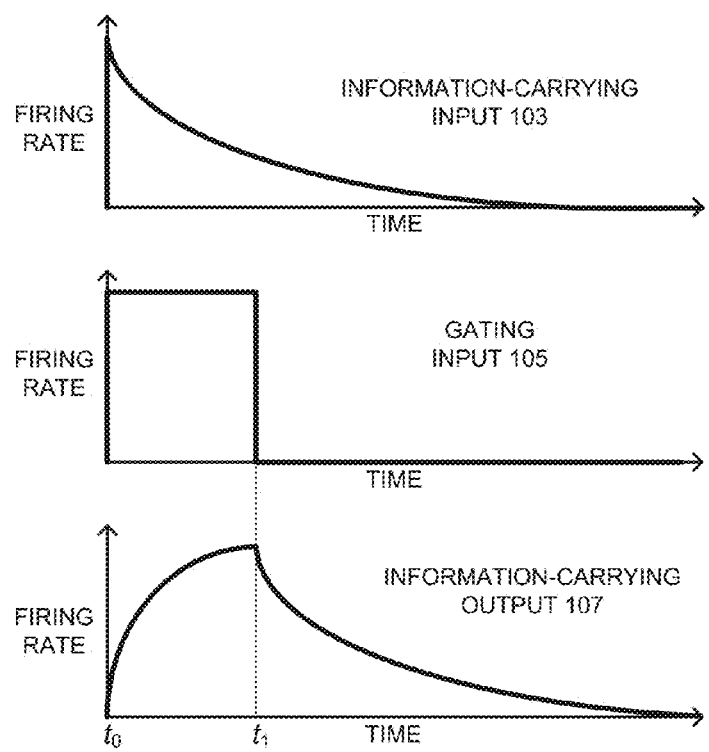
FIG. 2 presents timelines of firing rates for input and output signals illustrated in FIG. 1 in accordance with disclosed embodiments.

FIG. 2 presents timelines of exemplary firing rates for input and output signals illustrated in FIG. 1 in accordance with disclosed embodiments. The top graph in FIG. 2 displays firing rate versus time for information-carrying input 103. Note that this firing rate decays exponentially over time, although other decay rates can be used, such as a linear decay rate. The middle graph in FIG. 2 illustrates exemplary firings for gating input 105. Note that gating input 105 provides a "pulse input" comprising a square wave pulse that provides a burst of current pulses at a fixed rate during a fixed pulse duration. This fixed rate is calibrated to maintain a neural voltage of the neuron at a level immediately below the firing threshold of the neuron. Hence, this pulse input on its own will not cause neuron 104 to fire. However, the pulse input combined with additional current pulses on information-carrying input 103 will cause neuron 104 to fire.

The result of combining these inputs is illustrated in the bottom graph in FIG. 2, which displays the firing rate on information-carrying output 107. At the start of this graph at time $t_0$, the output firing rate starts at zero. However, at time $t_0$, the pulse input commences. This pulse input additively combines with the firing rate on information-carrying input 103 to cause the internal voltage on neuron 104 to rise above the firing threshold, which causes the output firing rate to increase as is illustrated in the lower graph in FIG. 2. When the pulse input finally falls at time $t_1$, the firing rate on information-carrying output 107 falls exponentially as the internal voltage of neuron 104 drops. The result of this process is to cause neuron 104 to output the same information that was received on information-carrying input 103, wherein the information is shifted in time. Hence, the gating pulse caused the information from upstream information-carrying neurons to be selectively transferred to information-carrying neuron 104. Note that this same gating technique can be used to transfer the same information to downstream information-carrying neurons 108.

Figure 3:
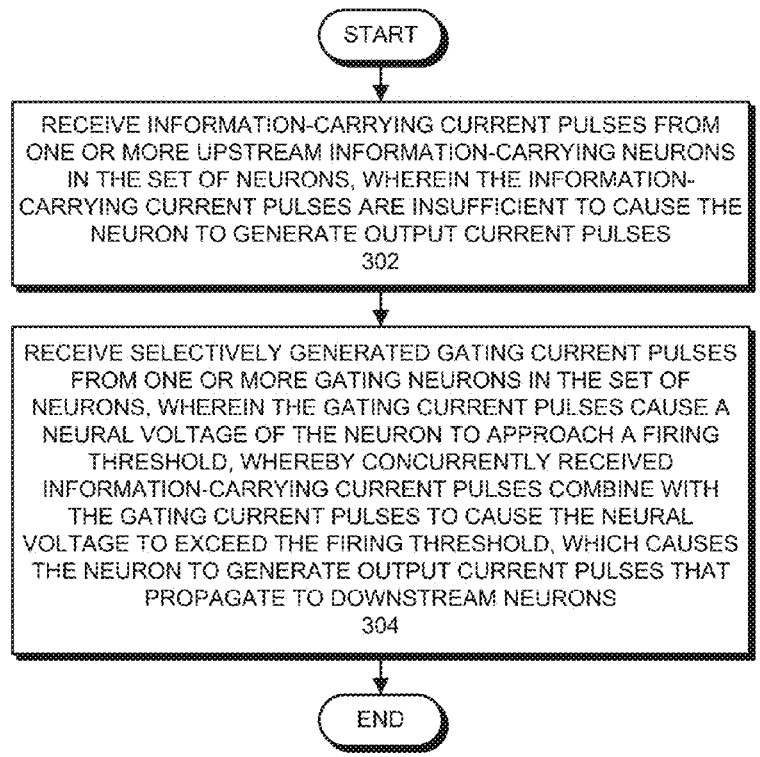
FIG. 3 presents a flow chart illustrating how an information-carrying neuron can selectively propagate information-carrying current pulses in accordance with the disclosed embodiments.

More specifically, FIG. 3 presents a flow chart illustrating how an information-carrying neuron can selectively propagate information-carrying current pulses in accordance with the disclosed embodiments. First, a neuron in the set of neurons receives information-carrying current pulses from one or more upstream information-carrying neurons, wherein the information-carrying current pulses are insufficient to cause the neuron to generate output current pulses (step 302). The neuron also receives selectively generated gating current pulses from one or more gating neurons, wherein the gating current pulses cause a neural voltage of the neuron to approach a firing threshold. In this way, concurrently received information-carrying current pulses combine with the gating current pulses to cause the neural voltage to exceed the firing threshold, which causes the neuron to generate output current pulses that propagate to downstream neurons (step 304).

Figure 4:
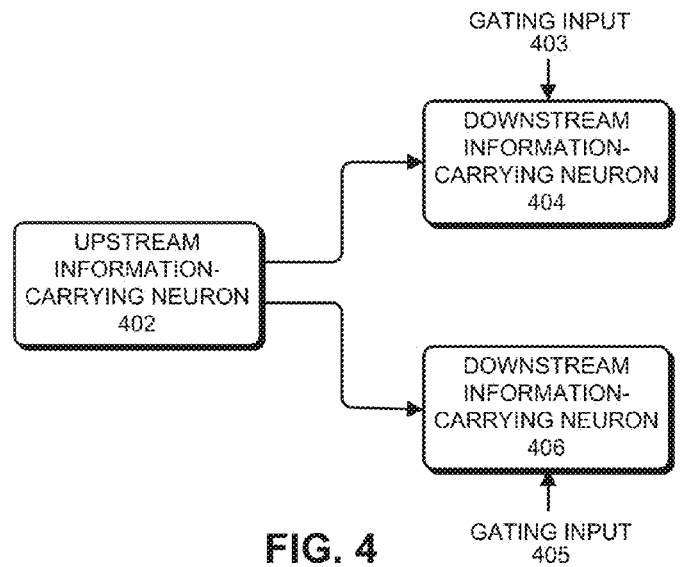
FIG. 4 illustrates how information can be selectively transferred from an upstream neuron to multiple downstream neurons in accordance with disclosed embodiments.

FIG. 4 illustrates how information can be selectively transferred from an upstream information-carrying neuron 402 to multiple downstream information-carrying neurons 404 and 406 in accordance with disclosed embodiments. In FIG. 4, each downstream information-carrying neuron has a separate gating input. More specifically, downstream information-carrying neuron 404 has a gating input 403 and downstream information-carrying neuron 406 has a gating input 405.

This configuration can be used to perform a copying operation. For example, if gating current pulses are sent to both gating inputs 403 and 405, this causes the information-carrying current pulses from upstream information-carrying neuron 402 to be copied to both downstream information-carrying neuron 404 and downstream information-carrying neuron 406.

This configuration can also be used to perform a switching operation. For example, if gating current pulses are directed to gating input 403 and not to gating input 405, this causes the information-carrying current pulses from upstream information-carrying neuron 402 to be selectively propagated to downstream information-carrying neuron 404 and not to downstream information-carrying neuron 406. Similarly, if gating current pulses are directed to gating input 405 and not to gating input 403, this causes the information-carrying current pulses from upstream information-carrying neuron 402 to be selectively propagated to downstream information-carrying neuron 406 and not to downstream information-carrying neuron 404.

Performing Matrix Operations Using Neurons

Figure 5:
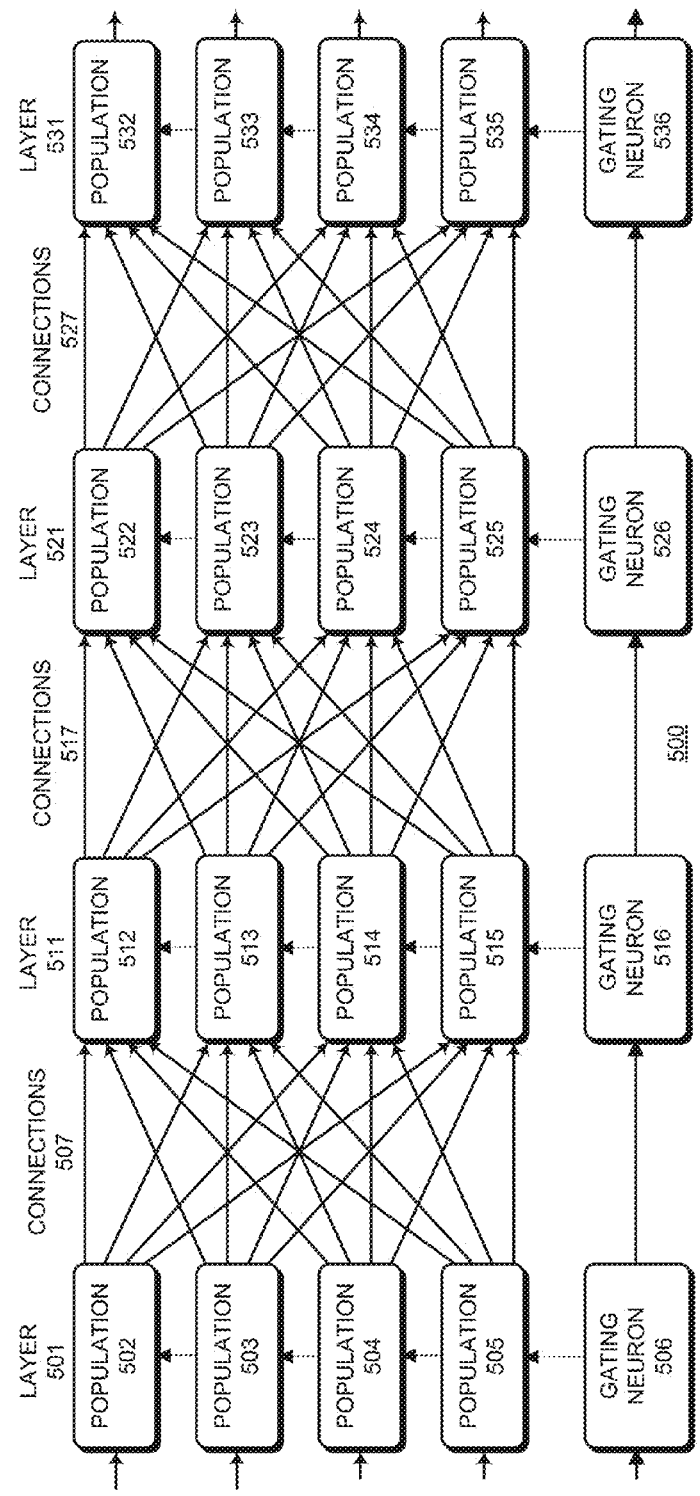
FIG. 5 illustrates a neural architecture that facilitates performing parallel matrix computations in accordance with disclosed embodiments.

FIG. 5 illustrates a neural architecture 500 that facilitates performing parallel matrix computations in accordance with disclosed embodiments. The neurons in architecture 500 are organized into populations, wherein each population includes one or more neurons and stores a different unit of information, and wherein the populations are organized into sets of interconnected layers 501, 511, 521 and 531. More specifically, on the left-hand side of FIG. 5, layer 501 includes populations 502-505, which are selectively triggered by gating signals received from neuron 506. Layer 511 includes populations 512-515, which are selectively triggered by gating signals received from neuron 516. Layer 521 includes populations 522-525, which are selectively triggered by gating signals received by neuron 526. Finally, layer 531 includes populations 532-535, which are selectively triggered by gating signals received from neuron 536.

Note that populations 502-505 in layer 501 are connected to populations 512-515 in layer 511 through a set of connections 507, wherein each connection comprises a weighted link that attenuates or amplifies a signal on the connection based on a weighting coefficient. Moreover, the firing rate of a given neuron in the downstream population is a weighted sum of inputs to the given neuron from the upstream population of neurons. In this way, a vector encoded in information-carrying pulses from the upstream populations of neurons is transformed through a matrix operation defined by the weighted links to produce a transformed vector of information-carrying pulses that is propagated to the downstream population of neurons. Note that layer 511 is similarly connected to layer 521 through connections 517, and layer 521 is connected to layer 531 through connections 527.

The movement of information among layers 501, 511, 521 and 531 is triggered by gating neurons 506, 516, 526 and 536. Note that gating neurons 506, 516, 526 and 536 are connected to form a gating chain, wherein a pulse applied to the input of gating neuron 506 propagates sequentially through gating neurons 516, 526 and 536. As this pulse propagates, it triggers information to flow through the connections 507, 517 and 527 among layers 501, 511, 521 and 531. During this process, the weighted links cause a matrix computation to be performed among the layers.

Figure 6:
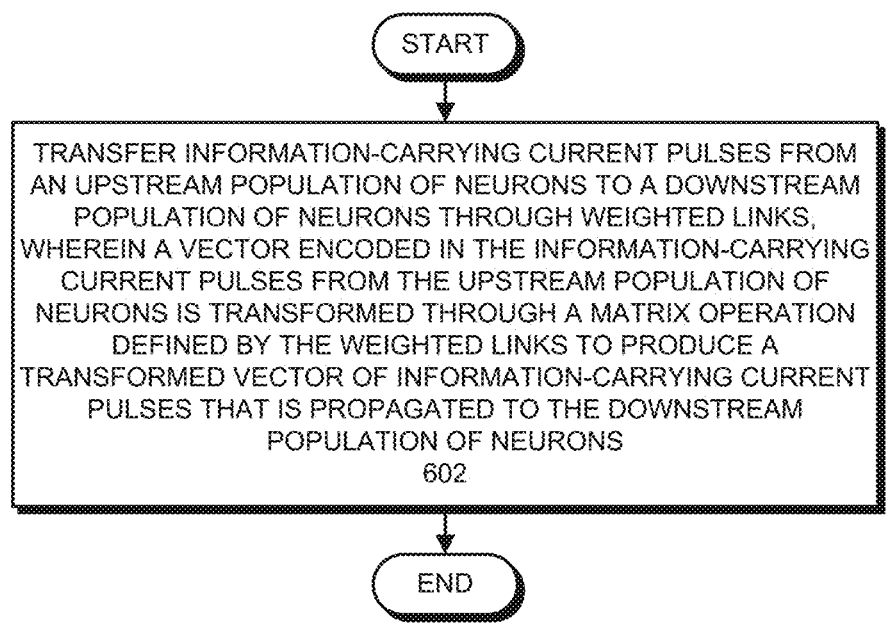
FIG. 6 presents a flow chart illustrating the operations involved in performing matrix computations while transferring information between populations of neurons in accordance with the disclosed embodiments.

More specifically, FIG. 6 presents a flow chart illustrating the operations involved in performing matrix computations while transferring information between populations of neurons in accordance with the disclosed embodiments. During operation, the system transfers information-carrying current pulses from an upstream population of neurons to a downstream population of neurons through weighted links, wherein a vector encoded in the information-carrying current pulses from the upstream population of neurons is transformed through a matrix operation defined by the weighted links to produce a transformed vector of information-carrying current pulses that is propagated to the downstream population of neurons (step 602).

Additional Details

The disclosed embodiments provide a mechanism by which a graded current amplitude may be exactly propagated from one neuronal population to another. This mechanism relies on the downstream gating of mean synaptic current amplitude from one population of neurons to another via a pulse. Because the transfer is pulse-based, information may be dynamically routed through a neural circuit with fixed connectivity. We demonstrate the transfer mechanism in a realistic network of spiking neurons and show that it is robust to noise in the form of pulse timing inaccuracies, random synaptic strengths and finite size effects. We also show that the mechanism is structurally robust in that it may be implemented using biologically realistic pulses. The transfer mechanism may be used as a building block for fast, complex information processing in neural circuits. We show that the mechanism naturally leads to a framework wherein neural information coding and processing can be considered as a product of linear maps under the active control of a pulse generator. Distinct control and processing components combine to form the basis for the binding, propagation, and processing of dynamically routed information within neural pathways. Using our framework, we construct exemplary neural circuits to (1) maintain a short-term memory, and (2) compute time-windowed Fourier transforms.

We show that information contained in the amplitude of a synaptic current may be exactly transferred from one neuronal population to another, as long as well-timed current pulses are injected into the populations. This mechanism is distinct from the synfire chains (see Abeles, M. (1982). Role of the cortical neuron: integrator or coincidence detector? *Israel Journal of Medical Sciences,* 18, 83-92, and Diesmann, M., Gewaltig, M. O., & Aertsen, A. (1999). Stable propagation of synchronous spiking in cortical neural networks. *Nature,* 402, 529-533) that can only transfer action potential volleys of fixed amplitude by using current pulses to gate information through a circuit in that it provides a neuronal-population-based means of dynamically propagating graded information through a neural circuit.

We derive our pulse-based transfer mechanism using mean-field equations for a current-based neural circuit and demonstrate it in an integrate-and-fire neuronal network. During operation, graded current amplitudes are transferred between upstream and downstream populations: a gating pulse excites the upstream population into the firing regime thereby generating a synaptic current in the downstream population. For didactic purposes, we first present results that rely on a square gating pulse with an ongoing inhibition keeping the downstream population silent until the feedforward synaptic current is integrated. We then show how more biologically realistic pulses with shapes filtered on synaptic timescales may be used for transfer. We argue that our mechanism represents crucial principles underlying what it means to transfer information. We then generalize the mechanism to the case of transfer from one vector of populations to a second vector of populations and show that this naturally leads to a framework for generating linear maps under the active control of a pulse generator. We also consider some of the implications of our mechanism and information coding framework, and future work.

Methods

What are the crucial principles underlying information transfer between populations of neurons? First, a carrier of information must be identified, such as synaptic current, firing rate, spike timing, etc. Once the carrier has been identified, we must determine the type of information, i.e., is the information analog or digital? Finally, we must identify what properties the information must exhibit for us to say that information has been transferred. In the mechanism that we present below, we use synaptic current as the information carrier. Information is graded and represented in a current amplitude and thus is best considered analog. The property that identifies information transfer is that the information exhibit a discrete, time-translational symmetry. That is, the waveform representing a graded current or firing rate amplitude in a downstream neuronal population must be the same as that in an upstream population, but shifted in time.

As noted above, mechanisms exist for propagating constant activity that have demonstrated time-translational symmetries in both strong and sparsely coupled regimes. Here, we address a mechanism for propagation of graded activity.

An additional consideration for biologically realistic information transfer is that it be dynamically routable, that is, that neural pathways may be switched on the millisecond time scale. This is achieved in our mechanism via pulse gating.

Circuit Model

Our neuronal network model consists of a set of j=1, . . . , M populations, each with i=1, . . . , N, of current-based, integrate-and-fire (I&F) point neurons. Individual neurons have membrane potentials, $v_{i,j}$, described by $$\frac{dv_{i,j}}{dt} = -g_{leak}(v_{i,j} - V_{Leak}) + I_{i,j}^{Total} \qquad (1a)$$

and feedforward synaptic current $$\tau \frac{dI_{i,j}^s}{dt} = -I_{i,j}^s + S \sum_l \sum_k \delta(t - t_{i,j-1}^k), \quad (1b)$$

with total currents $$I_{i,j}^{total} = I_{i,j}^k + I_j^{Exc} - I_j^{Inh} \quad (1c)$$

and $V_{Leak}$ is the leakage potential. The excitatory gating pulse on neurons in population j is $$I_j^{Exc}(t) = (I_0^{Exc} + \epsilon)(\theta(t - jT) - \theta(t - (j+1)T)), \quad (2)$$

where $\theta(t)$ is the Heaviside step function: $\theta(t)=0$, $t<0$ and $\theta(t)=1$, $t>0$. The ongoing inhibitory current is $$I_j^{Inh}(t) = I_0^{Inh}.$$

Here, $\tau$ is a current relaxation timescale depending on the type of neuromodulator (typical time constants are $\tau_{AMPA}$~3-11 ms or $\tau_{NMDA}$~60-150 ms). Individual spike times, $\{t_{i,j}^k\}$ with k denoting spike number, are determined by the time when the voltage $v_{i,j}$ reaches the threshold voltage, $V_{Thres}$, at which time the voltage is reset to $V_{Reset}$. We use units in which only time retains dimension (in seconds): the leakage conductance is $g_{Leak}$=50/sec. We set $V_{Reset}=V_{Leak}=0$ and normalize the membrane potential by the difference between the threshold and reset potentials, $V_{Thres}-V_{Reset}=1$. For the simulations reported here, we use $I_0^{Exc}$=180/sec and $I_0^{Inh}$=150/sec. Synaptic background activity is modeled by introducing noise in the excitatory pulse amplitude via $\epsilon$, where $\epsilon \sim N(0, \sigma^2)$, with $\sigma$=1/sec. The probability that neuron i in population j synapses on neuron k in population j+1 is $P_{ik}$=p. In our simulations, $p_N$=80.

Mean-Field Equations

Averaging (coarse-graining) spikes over time and over neurons in population j produces a mean firing rate equation given by $$m_j = \frac{-g_{Total}}{\ln\left(\frac{[I_j^{Total} - g_{Total}V_{Thres}]^+}{g_{Total}(V_{Thres} - V_{Reset}) + [I_j^{Total} - g_{Total}V_{Thres}]^+}\right)}, \quad (3)$$

where $g_{Total}=g_{Leak}$, and $$I_j^{Total} = I_j + I_j^{Exc} - I_j^{Inh}.$$

The feedforward synaptic current, $I_j+1$, is described by $$\tau \frac{d}{dt} I_{j+1} = -I_{j+1} + S m_j. \quad (4a)$$

The downstream population receives excitatory input, $m_j$, with synaptic coupling, S, from the upstream population. We set, $V_{Reset}=0$, and non-dimensionalize the voltage using $V_{Thres}-V_{Reset}=1$, so that $$m_j = \frac{-g_{Leak}}{\ln\left(\frac{[I_j^{Total} - g_{Leak}]^+}{g_{Leak} + [I_j^{Total} - g_{Leak}]^+}\right)}. \quad (4b)$$

This relation, the so-called f-I curve, can be approximated by $$m(I) \approx [m(I_0) + m'(I_0)(I - I_0)]^+ \quad (5)$$

$$= [m'(I_0)I - (m'(I_0)I_0 - m(I_0))]^+$$

$$\approx [I - g_0]^+$$

near $I \approx I_0$, where $m'(I_0) \approx 1$ (here the prime denotes differentiation), and letting $g_0 = m'(I_0)I_0 - m(I_0)$ be the effective threshold in the linearized f-I curve.

Exact Transfer

We consider transfer between an upstream population and a downstream population, denoted by j=u and j+1=d.

For the downstream population, for $t<0$, $I_d=0$. This may be arranged as an initial condition or by picking a sufficiently large $I_0^{Inh}$, with $$\tau \frac{d}{dt} I_d = -I_d + S[I_d(t) - I_0^{Inh} - g_0]^+. \quad (6)$$

At t=0, the excitatory gating pulse is turned on for the upstream population for a period T, so that for $0<t<T$, the synaptic current of the downstream population obeys $$\tau \frac{d}{dt} I_d = -I_d + S[I_u(t) + I_0^{Exc} - I_0^{Inh} - g_0]^+. \quad (7)$$

Therefore, we set the amplitude of the excitatory gating pulse to be $I_0^{Exc}=I_0^{Inh}+g_0$ to cancel the threshold. Making the ansatz $I_u(t)=Ae^{-t/\tau}$, we integrate $$\tau \frac{d}{dt} I_d = -I_d + S I_u$$

to obtain the expression $$I_d(t) = SA\frac{t}{\tau}e^{-t/\tau}, \quad 0 < t < T. \quad (8a)$$

During this time, ongoing inhibition is acting on the downstream population to keep it from spiking, i.e., we have $$m_d(t) = [I_d(t) - I_0^{Inh} - g_0]^+ = 0. \quad (8b)$$

For $T<t<2T$, the downstream population is gated by an excitatory pulse, while the upstream population is silenced by ongoing inhibition. The downstream synaptic current obeys $$\tau \frac{d}{dt} I_d = -I_d \quad (9a)$$

with $$I_d(T) = SA\frac{T}{\tau}e^{-T/\tau}. \quad (9b)$$

so that we have $$I_d(t) = SA\frac{T}{\tau}e^{-T/\tau}e^{-(t-T)/\tau}, \quad T < t < 2T \quad (9c)$$

and $$m_d(t) = [I_d(t) + I_0^{Exc} - g_0]^+ = I_d(t). \quad (9d)$$

For exact transfer, we need $I_d(t-T) = I_u(t)$; therefore, we write $$SA\frac{T}{\tau}e^{-T/\tau} = A. \quad (10)$$

So we have exact transfer with $$S_{exact} = \frac{\tau}{T}e^{T/\tau}. \quad (11)$$

To recap, we have the solution, with $S_{exact}$, $$I_d(t) = \begin{cases} A\frac{t}{\tau}e^{-t/\tau}, & 0 < t < T \\ A\frac{T}{\tau}e^{-t/\tau}, & T < t < \infty \end{cases} \quad (12a)$$

and $$m_d(t) = \begin{cases} 0, & 0 < t < T \\ A\frac{T}{\tau}e^{-t/\tau}, & T < t < 2T \\ 0, & 2T < t < \infty \end{cases} \quad (12b)$$

A Synfire-Based Gating Mechanism

In our exact solution, gating pulses have biologically unrealistic instantaneous onset and offset. Therefore, it becomes important to understand: (1) how robust graded propagation can be for gating pulses of realistic shape, and (2) whether there is a natural mechanism for the generation of these gating pulses. To test the structural robustness of graded propagation with a known pulse-generating mechanism, we implemented an I&F neuronal network model with two sets of populations; one set had synaptic strengths such that it formed stereotypical pulses with a fixed mean spiking profile and mean current waveform. The second set used these pulses, instead of square gating pulses, for current propagation. We call this neural circuit a Synfire-Gated Synfire Chain (SGSC).

Individual I&F neurons in the SGSC have membrane potentials described by $$\frac{d}{dt}v_{i,j}^\sigma = -g_{leak}(v_{i,j}^\sigma - v_{leak}) + \sum_{\sigma'=1}^{2} I_{i,j}^{\sigma\sigma'} + I_{i,j}^\sigma \quad (13a)$$

$$\tau\frac{d}{dt}I_{i,j}^{\sigma\sigma'} = -I_{i,j}^{\sigma\sigma'} + \frac{S^{\sigma\sigma'}}{p_{\sigma\sigma'}N_{\sigma'}}\sum_{i'}\sum_{k}\delta(t - t_{i',j-1}^{\sigma',k}) \quad (13b)$$

$$\tau\frac{d}{dt}I_{i,j}^\sigma = -I_{i,j}^\sigma + f^\alpha\sum_{k}\delta(t - s_{i,j}^k) \quad (13c)$$

where $i=1, \ldots, N_\sigma$, $j=1, \ldots, M$ and $\sigma, \sigma'=1, 2$ with 1 for the graded chain and 2 for the gating chain; individual spike times, $\{t_{i,j}^{\sigma,k}\}$, with k denoting spike number, are determined by the time when $v_{i,j}^\sigma$ reaches $V_{Thres}$. The gating chain receives a noise current, $I_{ij}^2$, generated from Poisson spike times, $\{s_{i,j}^k\}$, with strength $f^2=0.05$ and rate $v_2=400$ Hz, i.e., a noise current averaging 20/sec that is subthreshold (given by $g_{leak}=50$/sec). The current $I_{i,j}^{\sigma\sigma'}$ is the synaptic current of the $\sigma$ population produced by spikes of the $\sigma'$ population.

Information Processing Under Graded Transfer Mechanisms

Because for our mechanism current amplitude transfer is in the linear regime, downstream computations may be considered as linear maps (matrix operations) on a vector of neuronal population amplitudes. For instance, consider an upstream vector of neuronal populations with currents, $I^u$, connected via a connectivity matrix K to a downstream vector of neuronal populations, $I^d$:

$$I^u(t) \xrightarrow{K} I^d(t). \quad (14)$$

With feedforward connectivity, given by the matrix K, the current amplitude, $I^d$, from the mean-field model obeys $$\tau\frac{d}{dt}I^d = -I^d + s\left[\sum_{k}KI^u + p^j(t)\right]^+, \quad (15)$$

where $p^u(t)$ denotes a vector gating pulse on layer j. This results in the solution $I^d(t-T) = PKI^u(t)$, where P is a diagonal matrix with the gating pulse vector, p, of 0s and 1s on the diagonal indicating which neurons were pulsed during the transfer.

For instance, if the matrix of synaptic weights, K, were square and orthogonal, the transformation would represent an orthogonal change of basis in the vector space $\mathbb{R}^n$, where n is the number of populations in the vector. Convergent and divergent connectivities would be represented by non-square matrices.

This type of information processing is distinct from concatenated linear maps in the sense that information may be dynamically routed via suitable gating. Thus, we can envision information manipulation by sets of non-abelian operators, i.e., with non-commuting matrix generators, that may be flexibly coupled. We can also envision reentrant circuits or introducing pulse-gated nonlinearities into our circuit to implement regulated feedback.

Information Coding Framework

Our discussion has identified three components of a unified framework for information coding:
1. information content—graded current, I
2. information processing—synaptic weights, K
3. information control—pulses, p Note that the pulsing control, p, serves as a gating mechanism for routing neural information into (or out of) a processing circuit. We, therefore, refer to amplitude packets, I, that are guided through a neural circuit by a set of stereotyped pulses as "bound" information.

Consider one population coupled to multiple downstream populations. Separate downstream processing circuits may be multiplexed by pulsing one of the set of downstream circuits. Similarly, copying circuit output to two (or more)

distinct downstream populations may be performed by pulsing two populations that are identically coupled to one upstream population.

In order to make decisions, nonlinear logic circuits would be required. Many of these are available in the literature. Simple logic gates should be straightforward to construct within our framework by allowing interaction between information control and content circuits. For instance, to construct an AND gate, using gating pulses to feed two sub-threshold outputs into a third population, if the inputs are (0, 0), (0,1) or (1, 0), none of the combined pulses exceeds threshold and no output is produced. However, the input (1,1) would give rise to an output pulse. Other logic gates, including the NOT may be constructed, giving a Turing complete set of logic gates. Thus, these logic elements could be used for plastic control of functional connectivity, i.e., the potential for rapidly turning circuit elements on or off, enabling information to be dynamically processed.

A High-Fidelity Memory Circuit

As a first complete example of how graded information may be processed in circuits using pulse-gating, we demonstrate a memory circuit using the mean-field model. Our circuit generalizes the IM model described in Lisman and Idiart (Lisman, J. E., & Idiart, M. A. (1995). Storage of 7±2 short-term memories in oscillatory subcycles. *Science*, 267, 1512-1515) by Allowing for graded memory and arbitrary multiplexing of memory to other neural circuits. Because it is a population model, it is more robust to perturbations than the IM model, which transfers spikes between individual neurons. It is different from the IM model in that our circuit retains only one graded amplitude, not many (although this could be arranged). However, our model retains the multiple timescales that generate theta and gamma oscillations from pulse gating inherent to the IM model. Additionally, other graded memory models based on input integration (see Seung, S. H., Lee, D. D., Reis, B. Y., & Tank, D. W. (2000). Stability of the memory of eye position in a recurrent network of conductance-based model neurons. *Neuron*, 26, 259-271; and Goldman, M. S. (2008). Memory without feedback in a neural network. *Neuron*, 61, 621-634) make use of relatively large time constants that are larger even than NMDA timescales, whereas ours makes use of an arbitrary synaptic timescale, $\tau$, which may be modified to make use of any natural timescale in the underlying neuronal populations, including AMPA or NMDA. Our model is based on exact, analytical expressions, and because of this, the memory is infinitely long-lived at the mean-field level (until finite-sized effects and other sources of variability are taken into account).

The circuit has four components: a population for binding a graded amplitude into the circuit ('read in'), a cyclical memory, a 'read out' population meant to emulate the transfer of the graded amplitude to another circuit, and an input population. The memory is a set of n populations coupled one to the other in a circular chain with one of the populations (population 1) receiving gated input from the read in population. Memory populations receive coherent, phase shifted (by phase T) pulses that transfer the amplitude around the chain. In this circuit, n must be large enough that when population n transfers its amplitude back to population 1, population 1's amplitude has relaxed back to (approximately) zero. The read out is a single population identically coupled to every other population in the circular chain. This population is repeatedly pulsed, allowing the graded amplitude in the circular chain to be repeatedly read out.

Figure 7:
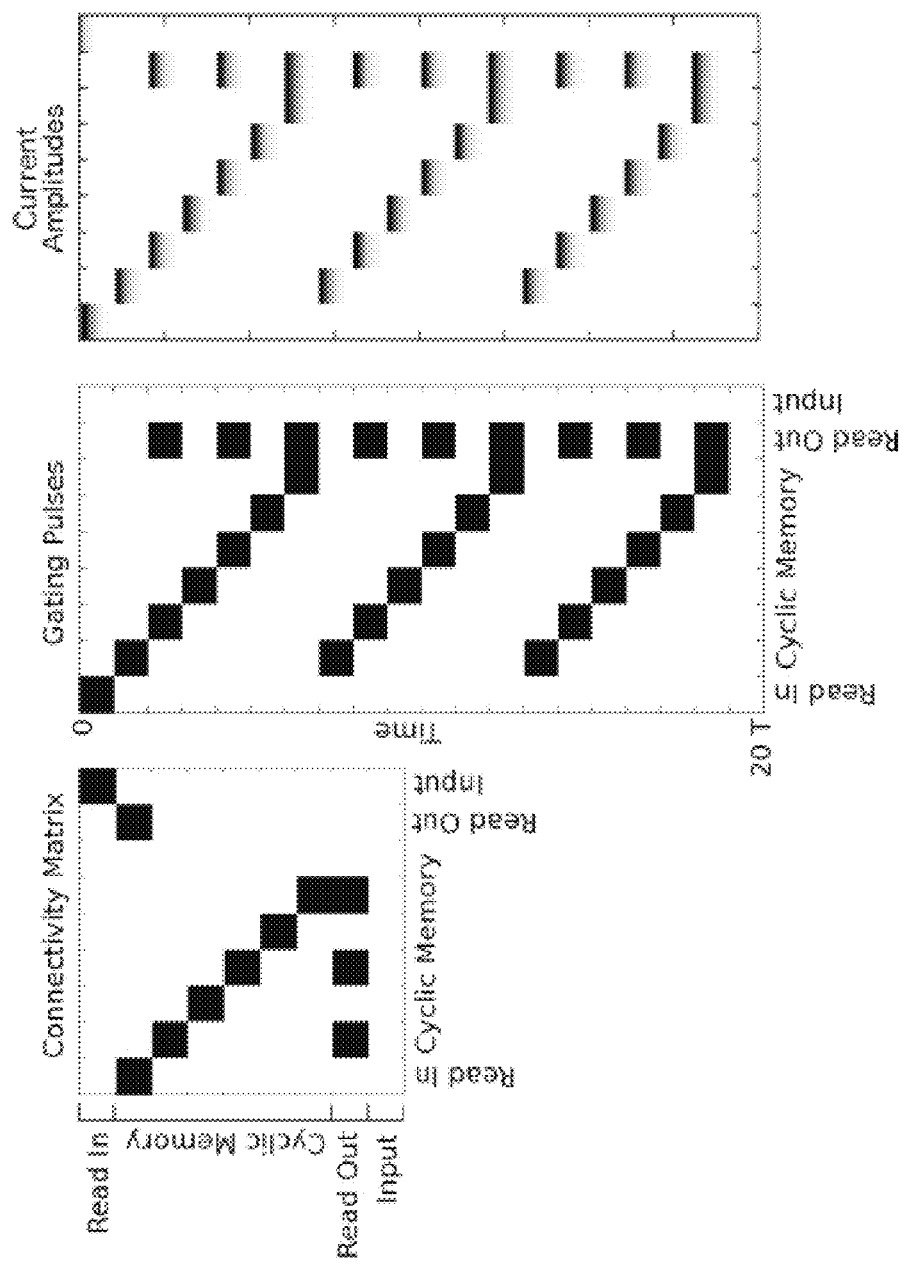
FIG. 7 presents connectivity and timing diagrams associated with a high-fidelity memory circuit in accordance with the disclosed embodiments.

In FIG. 7, we show an example of the memory circuit described here with n=6. The gating pulses sequentially propagate the graded current amplitude around the circuit. The read out population is coupled to every other population in the memory. Thus, in this example, the oscillation frequency of the read out population is three times that of the memory populations, i.e., theta-band frequencies in the memory populations would give rise to gamma-band frequencies in the read out.

This memory circuit, and other circuits that we present below, have the property that the binding of information is instantiated by the pulse sequence and is independent of the information carried in graded amplitudes and also independent of synaptic processing. Because of the independence of the control apparatus from information content and processing, this neural circuit is an automatic processing pathway whose functional connectivity (both internal and input/output) may be rapidly switched on or off and coupled to or decoupled from other circuits. We propose that such dynamically routable circuits, including both processing and control components, are the neural correlates of automatic cognitive processes that have been termed "zombie modes" (see Crick, F., & Koch, C. (2003). A framework for consciousness. *Nature Neuroscience*, 6, 119-126).

More specifically, FIG. 7 illustrates a memory circuit maintaining a single graded current amplitude. A connectivity matrix is illustrated at the left-hand side of FIG. 7. White denotes zero entries and black denotes ones. The connectivity matrix is subdivided into four rows. "Input" designates filtered input from an outside source. The first row connects the "Read In" population to the input. The Read In population transduces the filtered input into a graded current packet that then propagates through the memory circuit. The "Cyclic Memory" contains cyclically connected, feedforward populations around which the graded packet is propagated. The "Read Out" population is postsynaptic to every other population in the Cyclic Memory and may be used to transfer graded packets at high frequencies to another circuit. Gating pulses are illustrated in the middle portion of FIG. 7. White denotes zero, while black denotes $g_0$, the firing threshold. T/$\tau$=8. This sequence of gating pulses is used to bind and propagate the graded memory. Time runs from top to bottom. We show three complete cycles of propagation. The initial pulse on the Read In population binds the filtered input. The subsequent pulses within the Cyclic Memory rotate the packet through the memory populations. The pulses in the Read Out population copy the memory to a distinct population, which could be in another circuit. The right-hand side of FIG. 7 presents Current Amplitudes. White denotes zero; black denotes the maximum for this particular current packet. The input is transduced into the Read In population after time zero (upper left of panel). The memory is subsequently propagated through the circuit and copied from every other population to the Read Out.

A Moving Window Fourier Transform

The memory circuit above uses one-to-one coupling. It is simple in that information was copied, but not processed. Our second example demonstrates how more complex information processing may be accomplished within a zombie mode. With a simple circuit that performs a Hadamard transform (a Fourier transform based on square-wave-shaped Walsh functions), we show how streaming information may be bound into a memory, then processed via synaptic couplings between populations in the circuit.

A set of read in populations is synaptically coupled to the input. A set of memory chains is coupled to the read in. The final population in each memory chain is coupled via a connectivity matrix that implements a Hadamard transform. Gating pulses cause successive read in and storing in memory of the input until the Hadamard transform is performed once the memory contains all successive inputs in a given time window simultaneously. Because the output of Hadamard transform may be negative, two populations of Hadamard outputs are implemented, one containing positive coefficients, and another containing absolute values of negative coefficients.

Figure 8:
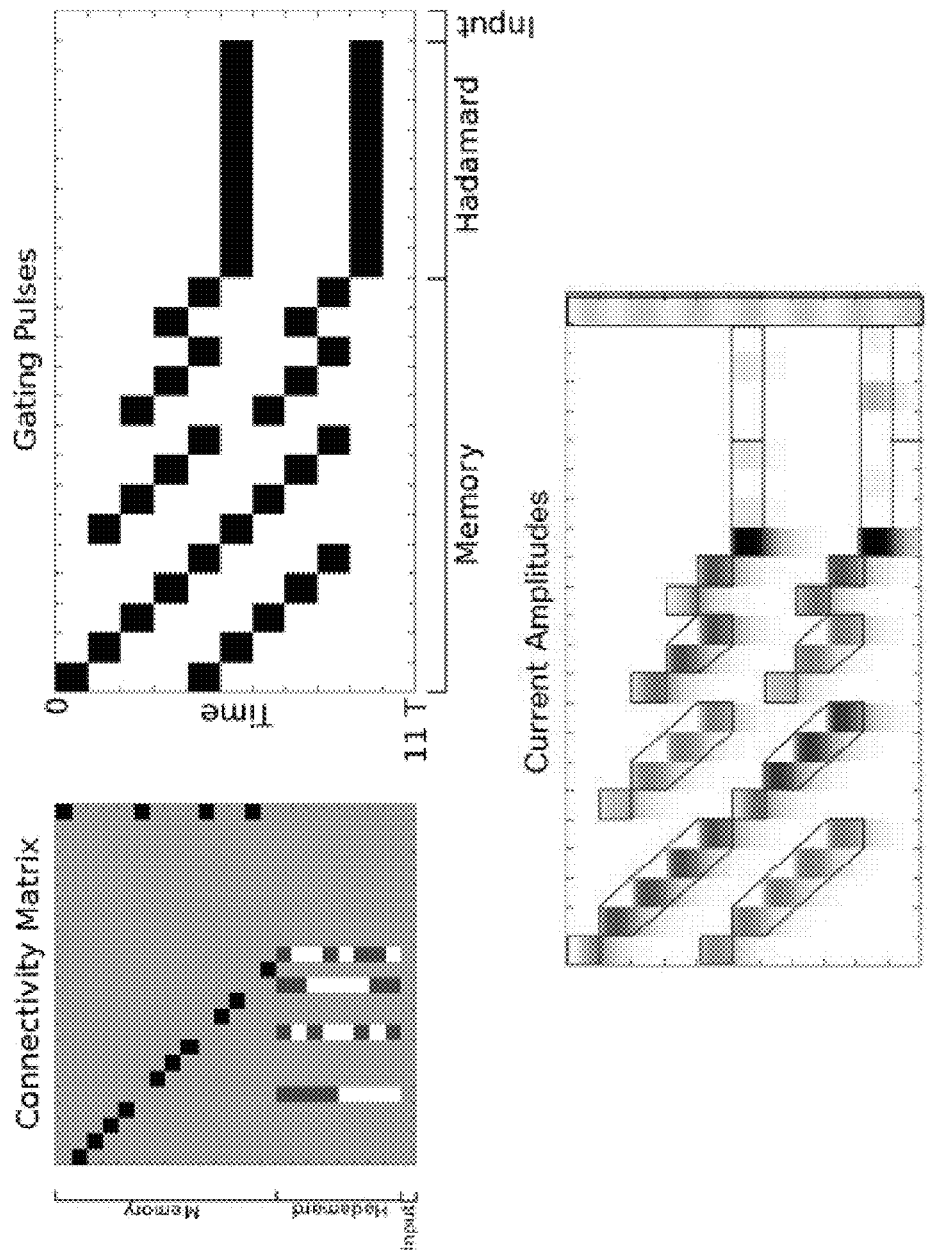
FIG. 8 presents connectivity and timing diagrams associated with a Hadamard transform in accordance with the disclosed embodiments.

In FIG. 8, we show a zombie mode where four samples are bound into the circuit from an input, which changes continuously in time. Memory populations hold the first sample over four transfers, the second sample over three transfers, etc. Once all samples have been bound within the circuit, the Hadamard transform is performed with a pulse on the entire set of Hadamard read out populations. While this process is occurring, a second sweep of the algorithm begins and a second Hadamard transform is computed.

The connectivity matrix for the positive coefficients of the Hadamard transform is given by $$H = \frac{1}{2}\begin{bmatrix} 1 & 1 & 1 & 1 \\ 1 & -1 & 1 & -1 \\ 1 & 1 & -1 & -1 \\ 1 & -1 & -1 & 1 \end{bmatrix},$$

and the absolute values of the negative coefficients use the transform $-H$.

More specifically, FIG. 8 illustrates a 4×4 Hadamard transform on a window of input values moving in time. A connectivity matrix appears in the top left portion of FIG. 8, wherein white denotes $-\frac{1}{2}$, light gray denotes 0, dark gray denotes $\frac{1}{2}$, and black denotes 1. The connectivity matrix is subdivided into three rows. "Memory" designates Read In and (non-cyclic) memory populations. "Hadamard" designates populations for the calculation of Hadamard coefficients. Because the packet amplitudes can only be positive, the Hadamard transform is divided into two parallel operations, one that results in positive coefficients and one that results in absolute values of negative coefficients. "Input" designates filtered input from an outside source.

The top right portion of FIG. 8 illustrates gating pulses, wherein white denotes 0, black denotes $g_0$, and $T/\tau=2$. Time runs from top to bottom. We show the computation for two successive windows, each of length 4T. The pulses transduce the input into four memory chains of length 4T, 3T, 2T and T. Thus, four temporally sequential inputs are bound in four of the memory populations beginning at time t=4, 8T. Hadamard transforms are performed beginning at t=5, 9T. Note that the second read in starts one packet length before the Hadamard transform so that the temporal windows are adjacent. The bottom portion of FIG. 8 illustrates current amplitudes, wherein white denotes 0, black denotes the maximum current amplitude, purple denotes read in, red denotes memory and blue denotes Hadamard transform populations. Note that the left four Hadamard outputs are positive coefficients. The right four are absolute values of negative coefficients. The sinusoidal input waveform is shown to the right.

Discussion

The existence of graded transfer mechanisms, such as the one that we have found, points toward a natural modular organization wherein each neural circuit would be expected to have 1) sparsely coupled populations of neurons that encode information content, 2) pattern generators that provide accurately timed pulses to control information flow, and 3) regulatory mechanisms for maintaining optimal transfer.

Our mechanism provides a fundamental building block with which graded information content may be encoded and transferred in current amplitudes, dynamically routed with coordinated pulses, and transformed and processed via synaptic weights. From this perspective, coherent oscillations may be an indication that a neural circuit is performing complex computations pulse by pulse.

Our mechanism for graded current transfer has allowed us to construct a conceptual framework for the active manipulation of information in neural circuits. An important aspect of this type of information coding is that it separates control of the flow of information from information processing and the information itself.

The current transfer mechanism is sufficiently flexible that the pulses used for gating may be of different durations depending on the pulse length, T, and the time constant, $\tau$, of the neuronal population involved. The separation of control populations from those representing information content distinguishes our framework from mechanisms such as the communication-through-coherence (CTC) model (see Fries, P. (2005). A mechanism for cognitive dynamics: neuronal communication through neuronal coherence. *Trends in Cognitive Sciences*, 9, 474-480), where communication between neuronal populations depends on the coincidence of integration windows in phase-coherent oscillations. In the CTC mechanism, information containing spikes must coincide to be propagated. In our framework, information containing spikes must coincide with gating pulses that enable communication. In this sense, it is "communication through coherence with a control mechanism."

The basic unit of computation in our framework is a pulse-gated transfer. Given this, we suggest that each individual pulse within an oscillatory set of pulses represents the transfer and processing of a discrete information packet. For example, in a sensory circuit that needs to quickly and repeatedly process a streaming external stimulus, short pulses could be repeated in a stereotyped, oscillatory manner using high-frequency gamma oscillations to rapidly move bound sensory information through the processing pathway. Circuits that are used occasionally or asynchronously might not involve oscillations at all, just a precise sequence of pulses that gate a specific information set through a circuit.

An important point to note is that, given a zombie mode that implements an algorithm for processing streaming input, one can straightforwardly predict the rhythms that the algorithm should produce (for instance in our examples, calculate power spectra of the current amplitudes). This feature of zombie modes can provide falsifiable hypotheses for putative computations that the brain uses to process information.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for selectively propagating signals through a neuromorphic circuit comprising a set of interconnected neurons implemented as an electrical circuit, the method comprising:

receiving, at a neuron in the set of neurons, signal-carrying current pulses from one or more upstream signal-carrying neurons in the set of neurons, wherein the signal-carrying current pulses are insufficient to cause the neuron to generate output current pulses; and receiving, at the neuron, selectively generated gating current pulses from one or more gating neurons in the set of neurons;

wherein the gating current pulses cause a neural voltage of the neuron to approach a firing threshold, whereby concurrently received signal-carrying current pulses combine with the gating current pulses to cause the neural voltage to exceed the firing threshold, which causes the neuron to generate output current pulses that propagate to downstream neurons wherein the set of neurons includes an upstream population of neurons and a downstream population of neurons;

wherein neurons in the upstream population are connected to neurons in the downstream population through weighted links, wherein a firing rate of a given neuron in the downstream population is a weighted sum of inputs to the given neuron from the upstream population of neurons; and wherein a vector encoded in signal-carrying current pulses from the upstream population of neurons is transformed through a matrix operation defined by the weighted links to produce a transformed vector of signal-carrying current pulses that is propagated through the downstream population of neurons by applying gating current pulses to the downstream population of neurons.

2. The method of claim 1, wherein the method further comprises selectively generating the gating current pulses that feed into the neuron to cause the neuron to selectively propagate the signal-carrying current pulses to the downstream neurons.

3. The method of claim 1, wherein the signal-carrying current pulses and the gating current pulses are combined in a capacitive element within the neuron to produce the neural voltage.

4. The method of claim 1, wherein the method further comprises directing gating current pulses to two of the downstream neurons to cause the signal-carrying current pulses to be copied to the two downstream neurons.

5. The method of claim 1, wherein the method further comprises:

directing gating current pulses to a first neuron and not to a second neuron in the downstream neurons to cause the signal-carrying current pulses to be selectively propagated to the first neuron and not to the second neuron; and directing gating current pulses to the second neuron and not to the first neuron to cause the signal-carrying current pulses to be selectively propagated to the second neuron and not to the first neuron.

6. The method of claim 1, wherein the downstream neurons include a circular chain of neurons; and wherein the method further comprises directing gating current pulses to neurons in the circular chain of neurons in sequential order to cause the signal-carrying current pulses to continually propagate around the circular chain of neurons, whereby the circular chain of neurons functions as a memory for the signal-carrying current pulses.

7. The method of claim 1, wherein the neuromorphic circuit is implemented as one of the following:

a digital electrical circuit; and an analog electrical circuit.

8. The method of claim 7, wherein the set of neurons includes signal-carrying neurons and gating neurons;

wherein the gating neurons are connected into a gating chain, wherein gating current pulses propagate sequentially through the gating neurons in the gating chain; and wherein the signal-carrying neurons are organized into an signal-carrying chain, wherein signal-carrying current pulses propagate through signal-carrying neurons in the signal-carrying chain under control of gating current pulses received from corresponding gating neurons in the gating chain.

9. The method of claim 8, wherein the signal-carrying neurons in the signal-carrying chain are organized into a set of layers, wherein each layer contains two or more signal-carrying neurons; and wherein layers in the set of layers are sequentially connected to form the signal-carrying chain.

10. A system that selectively propagates signals through a neuromorphic circuit comprising a set of interconnected neurons implemented as an electrical circuit, the system comprising:

a set of neurons that comprises the neuromorphic circuit;

wherein during operation, a neuron in the set of neurons, receives signal-carrying current pulses from one or more upstream signal-carrying neurons in the set of neurons, wherein the signal-carrying current pulses are insufficient to cause the neuron to generate output current pulses, and receives selectively generated gating current pulses from one or more gating neurons in the set of neurons, wherein the gating current pulses cause a neural voltage of the neuron to approach a firing threshold, whereby concurrently received signal-carrying current pulses combine with the gating current pulses to cause the neural voltage to exceed the firing threshold, which causes the neuron to generate output current pulses that propagate to downstream neurons wherein the set of neurons includes an upstream population of neurons and a downstream population of neurons;

wherein neurons in the upstream population are connected to neurons in the downstream population through weighted links, wherein a firing rate of a given neuron in the downstream population is a weighted sum of inputs to the given neuron from the upstream population of neurons; and wherein a vector encoded in signal-carrying current pulses from the upstream population of neurons is transformed through a matrix operation defined by the weighted links to produce a transformed vector of signal-carrying current pulses that is propagated through the downstream population of neurons by applying gating current pulses to the downstream population of neurons.

11. The system of claim 10, wherein the one or more gating neurons selectively generate the gating current pulses that feed into the neuron to cause the neuron to selectively propagate the signal-carrying current pulses to the downstream neurons.

12. The system of claim 10, wherein the signal-carrying current pulses and the gating current pulses are combined in a capacitive element within the neuron to produce the neural voltage.

13. The system of claim 10, wherein the one or more gating neurons direct gating current pulses to two of the downstream neurons to cause the signal-carrying current pulses to be copied to the two downstream neurons.

14. The system of claim 10, wherein the one or more gating neurons:
   direct gating current pulses to a first neuron and not to a second neuron in the downstream neurons to cause the signal-carrying current pulses to be selectively propagated to the first neuron and not to the second neuron; and
   direct gating current pulses to the second neuron and not to the first neuron to cause the signal-carrying current pulses to be selectively propagated to the second neuron and not to the first neuron.

15. The system of claim 10,
   wherein the downstream neurons include a circular chain of neurons; and
   wherein the one or more gating neurons direct gating current pulses to neurons in the circular chain of neurons in sequential order to cause the signal-carrying current pulses to continually propagate around the circular chain of neurons, whereby the circular chain of neurons functions as a memory for the signal-carrying current pulses.

16. The system of claim 10, wherein the neuromorphic circuit is implemented as one of the following:
   a digital electrical circuit; and
   an analog electrical circuit.

17. The system of claim 16,
   wherein the set of neurons includes signal-carrying neurons and gating neurons;
   wherein the gating neurons are connected into a gating chain, wherein gating current pulses propagate sequentially through the gating neurons in the gating chain; and
   wherein the signal-carrying neurons are organized into an signal-carrying chain, wherein signal-carrying current pulses propagate through signal-carrying neurons in the signal-carrying chain under control of gating current pulses received from corresponding gating neurons in the gating chain.

18. The system of claim 17,
   wherein the signal-carrying neurons in the signal-carrying chain are organized into a set of layers, wherein each layer contains two or more signal-carrying neurons; and
   wherein layers in the set of layers are sequentially connected to form the signal-carrying chain.

* * * * *